United States Patent Office 3,083,197
Patented Mar. 26, 1963

3,083,197
21-CARBAMATE DERIVATIVES OF
21-HYDROXY STEROIDS
Horace D. Brown, Plainfield, and Lewis H. Sarett, Princeton, N.J., assignors to Merck & Co., Inc., Rahway, N.J., a corporation of New Jersey
No Drawing. Filed Dec. 1, 1961, Ser. No. 156,476
15 Claims. (Cl. 260—239.5)

This invention relates to new derivatives of steroid compounds having cortisone-like activity; more particularly, it is concerned with new 21-carbamate derivatives of 21-hydroxy steroids having cortisone-like activity and with methods of preparing these derivatives.

Cortisone and certain related steroid compounds have been found to be of inestimable value both locally and systemically in the treatment of rheumatism and arthritis. In particular, these compounds have been found to be especially valuable in the treatment of rheumatoid or osteorithritic joints by intra-articular injection.

It is an object of the present invention to provide novel derivatives of steroid compounds having pronounced local cortisone-like activity, but without possessing any appreciable systemic activity. Another object is to provide processes for the preparation of these new steroid derivatives. A further object is to provide new pharmaceutical compositions containing said novel steroid compounds. Other objects will be apparent from the detailed description of the invention hereinafter provided.

In accordance with the present invention, it has now been found that steroid 21-(N-phenyl) carbamates, 21-(4-methyl-1-piperazinyl) carbamates and the d-bitartrate salts of said piperazinyl derivatives having cortisone-like activity are valuable new compounds having pronounced local activity. Thus, these saturated and unsaturated compounds of the pregnane series having an oxygen substituent at $C_{11}$, hydroxy substituents at $C_{17}$ and $C_{21}$, keto groups at $C_3$ and $C_{20}$, a hydrogen or a halo group at $C_9$, and having unsaturation in the A-ring at $C_4$ or $C_1$ and $C_4$ are found to possess high local cortisone-like activity. The new carbamate derivatives can be represented by the partial formula:

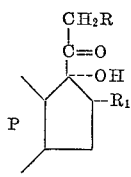

wherein R is selected from the group consisting of

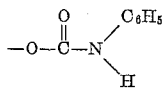

and

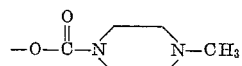

P represents a saturated or unsaturated pregnane ring nucleus having an oxygen substituent, such as keto or hydroxyl, at $C_{11}$, hydrogen or a halo substituent at $C_9$, and a keto group at $C_3$, and $R_1$ is hydrogen or lower alkyl. The terms pregnane compounds or compounds of the pregnane series as used herein refers to both saturated pregnanes and unsaturated compounds such as pregnenes and pregnadienes. Examples of such compounds which are found to possess high local activity that might be mentioned are the 21-(N-phenyl) carbamate and 21-(4-methyl-1-piperazinyl) carbamate derivatives of 4-pregnene-17α,21-diol-3,11,20 - trione, 4-pregnene-11β,17α,21-triol-3,20-dione, 9α-chloro-4-pregnene-17α,21-diol-3,11,20-trione, 9α-fluoro-4-pregnene-11β,17α,21-triol - 3,20-dione, 1,4-pregnadiene-11β,17α,21 - triol - 3,20-dione, 9α-fluoro-1,4-pregnadiene-11β,17α,21-triol-3,20 - dione, 1,4-pregnadiene-17α,21-diol - 3,11,20 - trione, 9α - fluoro-1,4-pregnadiene-17α,21-diol-3,11,20-trione, 16α-methyl-17α,21-dihydroxy-1,4-pregnadiene - 3,11,20 - trione, 16α-methyl-11β, 17α,21-trihydroxy-1,4 - pregnadiene-3,20-dione, 9α-fluoro-16α-methyl-17α,21-dihydroxy - 1,4 - pregnadiene - 3,11,20-trione, 9α-fluoro-16α-methyl-11β,17α,21-trihydroxy - 1,4-pregnadiene-3,20-dione, and the like.

The new 21-(4-methyl-1-piperazinyl) carbamate derivatives, as well as their d-bitartrate salts are conveniently prepared by reacting the corresponding 21-hydroxy steroid with a 4-methyl-1-piperazinyl carbamyl derivative, as for example, 4-methyl-1-piperazinyl carbamyl chloride. This reaction may readily be achieved by contacting the carbamyl chloride with the 21-hydroxy steroid in an inert organic solvent, preferably pyridine, although such solvents as benzene, toluene and the like may also be employed. The mixture is desirably stirred at room temperature for about 24–36 hours, any precipitated excess carbamyl salt (as the hydrochloric salt) removed by filtration and the desired steroid carbamate recovered from the filtrate.

The recovery is readily achieved by evaporating the filtrate to a thick gum, which, after being treated with potassium carbonate and dried, is then dissolved in a solvent such as ethanol and reacted with a solution of d-tartaric acid dissolved in ethanol. The reaction mixture is allowed to stand at room temperature for about 3–4 hours, whereupon the precipitated steroid 21-(4-methyl-1-piperazinyl) carbamate-d-bitartrate salt is recovered by filtration. If desired, this product may be further purified by recrystallization from a suitable solvent such as ethanol, acetone or the like.

The steroid 21-(4-methyl-1-piperazinyl) carbamate-d-bitartrate salt may conveniently be converted to the corresponding free base by reaction of the tartrate salt with a strong base such as sodium hydroxide or potassium hydroxide, stirring the mixture for about 1 hour and recovering the precipitated steroid 21-(4-methyl-1-piperazinyl) carbamate by filtration. Additionally, the free base may then be converted to the corresponding acid salt by reaction with a strong mineral acid, preferably hydrochloric acid, to form the corresponding steroid 21-(4-methyl-1-piperazinyl) carbamate hydrochloride or like salt.

The starting material 4-methyl-1-piperazinyl carbamyl chloride is conveniently prepared by reacting N-methylpiperazine with phosgene to produce 4-methyl-1-piperazinyl carbamyl chloride as the hydrochloride salt. This reaction is readily conducted by dissolving the N-methylpiperazine in an inert organic solvent such as benzene, toluene, xylene or the like and contacting this solution with phosgene gas dissolved in toluene for about 1 hour at low temperature, preferably at approximately 0° C. The resulting product may then be recovered by filtration and further purified by conventional means. Trituration of the hydrochloride salt with cold saturated potassium carbonate and extraction into ether serves to isolate the 4-methyl-1-piperazinyl carbamyl chloride from its hydrochloride salt.

The new phenyl carbamate derivatives of the present invention are readily prepared by reacting the corresponding 21-hydroxy steroids with phenyl isocyanate. This reaction is conveniently effected by intimately contacting the phenyl isocyanate with the 21-hydroxy steroid in a suitable inert solvent medium such as benzene, toluene, xylene, dimethoxyethane, ethyl benzene, and the like. Thus, the preparation of the phenyl carbamate compound is most conveniently carried out by heating the reaction mixture consisting of the pregnane alcohol and the phenyl isocyanate in the inert solvent for sufficient time to complete the formation of the desired phenyl carbamate. In carrying out the reaction, it is desirable to have an excess of the phenyl isocyanate present over the one mole theoretically required per mole of the steroid alcohol in order to insure completion of the reaction and the recovery of maximum yields of the desired product. In general, it is preferable to carry out the reaction in an essentially dry medium, since under these conditions maximum yields of desired product are obtained under optimum conditions.

The phenyl carbamates are conveniently recovered from the resulting reaction mixture by evaporating the solvent and any excess phenyl isocyanate under reduced pressure, and crystallizing the resulting residue containing the desired product from a suitable solvent or solvent mixture such as acetone, acetone-ether, acetone-petroleum ether, and the like.

In accordance with another embodiment of this invention, there are provided novel pharmaceutical preparations containing these new carbamate derivatives. Compositions comprising suspensions of these carbamates in suitable pharmaceutical vehicles and carriers can be prepared in accordance with methods well known in this art. For example, suitable suspensions in aqueous saline can be prepared pursuant to methods well known in this art. In addition, suspensions of these carbamates in non-aqueous mediums are likewise prepared in accordance with methods described in this art. Similarly, aqueous solutions of the water soluble salts may be employed.

Although the concentration of the active ingredient in the novel pharmaceutical preparations may be varied within wide limits, it is preferred to employ the carbamate compounds in an amount ranging from about 0.1% to about 25% by weight of the composition, depending on the particular pharmaceutical vehicle and the use intended. Vehicles containing from about 1% to 5% of the active phenyl carbamates have been found to be particularly satisfactory and are therefore preferred.

The following examples illustrate methods of carrying out the present invention but it is to be understood that these examples are given for purposes of illustration and not of limitation.

EXAMPLE 1

*4-Pregnene-11β,17α,21-Triol-3,20-Dione 21-(N-Phenyl) Carbamate*

A solution of 0.7 g. of 4-pregnene-11β,17α,21-triol-3,20-dione in 25 ml. of benzene is dried by distilling off about 5 ml. of benzene. Then 5 ml. of phenyl isocyanate is added to the dried benzene solution, and the resulting reaction mixture is heated under reflux for four hours. The mixture is then cooled and concentrated under reduced pressure to remove the benzene and excess isocyanate leaving as a solid residue the 4-pregnene-11β,17α,21-triol-3,20-dione 21-(N-phenyl) carbamate. This residue is washed with a small amount of acetone to remove impurities and then crystallized from a mixture of acetone-ether to yield crystals.

In accordance with the foregoing procedure, but starting with 4-pregnene-17α,21-diol-3,11,20-trione, there is obtained the corresponding 4-pregnene-17α,21-diol-3,11,20-trione 21-(N-phenyl) carbamate.

EXAMPLE 2

*1,4-Pregnadiene-11β,17α,21-Triol-3,20-Dione 21-(N-Phenyl) Carbamate*

To a dry solution of 1.44 g. of 1,4-pregnadiene-11β,17α,21-triol-3,20-dione in about 20 ml. of dimethoxy ethane is added 0.62 g. of phenyl isocyanate. The resulting reaction mixture is heated to reflux temperature for about one and one-half hours. The reaction mixture is then concentrated to a dry solid under reduced pressure to remove solvent and excess isocyanate. When the residue is crystallized from acetone-ether, 1,4-pregnadiene-11β,17α,21-triol-3,20-dione 21-(N-phenyl) carbamate is obtained in crystalline form.

In accordance with the foregoing procedure, but starting with 1,4-pregnadiene-17α,21-diol-3,11,20-trione, there is obtained the corresponding 1,4-pregnadiene-17α,21-diol-3,11,20-trione 21-(N-phenyl) carbamate.

EXAMPLE 3

*9α-Fluoro-4-Pregnene-11β,17α,21-Triol-3,20-Dione 21-(N-Phenyl) Carbamate*

A solution of 1.41 g. of 9α-fluoro-4-pregnene-11β,17α,21-triol-3,20-dione in 25 ml. of toluene is dried by distilling off a few mls. of solvent. Then 2 ml. of phenyl isocyanate is added and the mixture heated under reflux for three hours. The reaction mixture is then concentrated under reduced pressure to remove most of the solvent and excess isocyanate. The resulting residue containing the 9α-fluoro-4-pregnene-11β,17α,21-triol-3,20-dione 21-(N-phenyl) carbamate is then washed with a few small portions of ether to remove traces of excess isocyanate and the diphenyl urea which forms as a minor by-product. Crystallization of the washed residue affords crystals of substantially pure product.

In accordance with the foregoing procedure, but starting with 9α-fluoro-4-pregnene-17α,21-diol-3,11,20-trione, there is obtained the corresponding 9α-fluoro-4-pregnene-17α,21-diol-3,11,20-trione 21-(N-phenyl) carbamate.

EXAMPLE 4

*9α-Fluoro-1,4-Pregnadiene-11β,17α,21-Triol-3,20-Dione 21-(N-Phenyl) Carbamate*

When 1.4 g. of 9α-fluoro-1,4-pregnadiene-11β,17α,21-triol-3,20-dione is reacted with 2 ml. of phenyl isocyanate in about 20 ml. of dry toluene at reflux temperature for about two hours and the resulting reaction product is recovered as described in Example 3, 9α-fluoro-1,4-pregnadiene - 11β,17α,21 - triol-3,20-dione 21-(N-phenyl) carbamate is obtained.

In accordance with the foregoing procedure, but starting with 9α-fluoro-1,4-pregnadiene-17α,21-diol-3,11,20-trione, there is obtained the corresponding 9α-fluoro-1,4-pregnadiene-17α,21 - diol- 3,11,20-trione 21-(N-phenyl) carbamate.

EXAMPLE 5

*4-Methyl-1-Piperazinylcarbamyl Chloride*

Phosgene gas is passed into 460 ml. of ice-cold toluene until 200–250 g. (2.02–2.53 moles) are collected. To this solution at 0° C. is added 17.2 g. N-methyl-piperazine (0.172 mole) dissolved in 200 ml. of toluene over a one-half hour period. The mixture is stirred at 0° C. for one hour and then at 25° C. for two hours. The hydrochloride salt of the product is filtered, washed with toluene and then with ether. After removing most of the ether at 40° C. under reduced pressure the entire precipitate is added to a stirred, ice-cold mixture of 100 ml. saturated potassium carbonate, 120 ml. methylene chloride, and 80 ml. petroleum ether. The organic layer (upper layer) is removed, washed with 50 ml. water and dried over sodium sulfate. After removing the solvents at room temperature under reduced pressure, an oily residue of 4-methyl-1-piperazinylcarbamyl chloride is obtained.

EXAMPLE 6

*9α - Fluoro-16α-Methyl-11β,17α,21-Trihydroxy-1,4-Pregnadiene - 3,20 - Dione 21 - (4-Methyl-1-Piperazinyl) Carbamate-d-Bitartrate Salt*

9α-fluoro-16α-methyl-11β,17α,21-trihydroxy-1,4 - pregnadiene-3,20-dione (15.35 g., 0.0391 mole) is added to a solution of 19.0 g. (0.117 mole) freshly prepared 4-methyl-1-piperazinylcarbamyl chloride in 138 ml. of dry pyridine. The mixture is stirred at 25° C. for 24 hours during which time a fine crystalline precipitate of 4-methyl - 1 - piperazinylcarbamyl chloride hydrochloride is formed. The precipitate is removed by suction filtration and washed with pyridine. The combined filtrates are evaporated under reduced pressure to a thick gum and the residue triturated with 100 ml. 10% potassium carbamate with stirring. The solidified product is collected by suction filtration, washed with water, and dried at 50° C. under reduced pressure. This product is dissolved in 210 ml. absolute ethanol and a solution of 21 g. of d-tartaric acid dissolved in 100 ml. absolute ethanol is added. After standing at room temperature for three hours the precipitated crude tartrate salt is filtered, washed with ethanol, and dried at 50° C. The crude product is recrystallized from 1500 ml. 90% ethanol, the hot solution being treated with 2 g. nuclear C 1000 N. The clear filtrate is stirred over night at room temperature and then stirred at 10° C. for one hour prior to filtration of the product. After drying at 50° C. under reduced pressure there is obtained 9α-fluoro - 16α-methyl-11β,17α,21-trihydroxy-1.4-pregnadiene-3,20-dione 21-(4-methyl-1-piperazinyl) carbamate-d-bitartrate salt.

In accordance with the foregoing procedure, but starting with 9α-fluoro-16α-methyl-17α,21-dihydroxy-1,4-pregnadiene - 3,11,20-trione, 16α-methyl-17α,21-dihydroxy-1, 4 - pregnadiene-3,11,20-trione, 16α-methyl-11β,17α,21-trihydroxy - 1,4 - pregnadiene-3,20-dione, 9α-fluoro-11β,17α, 21 - trihydroxy - 1,4 - pregnadiene-3,20-dione, or 11β,17α, 21 - trihydroxy - 1,4 - pregnadiene-3,20-dione, there are obtained the corresponding 9α-fluoro-16α-methyl-17α,21-dihydroxy - 1,4 - pregnadiene - 3,11,20-trione 21-(4-methyl - 1 - piperazinyl) carbamate-d-bitartrate salt, 16α-methyl-17α,21 - dihydroxy - 1,4-pregnadiene-3,11,20-trione 21 - (4 - methyl-1-piperazinyl) carbamate-d-bitartrate salt, 16α - methyl-11β,17α,21-trihydroxy-1,4-pregnadiene-3,20 - dione 21 - (4-methyl-1-piperazinyl) carbamate-d-bitartrate salt, 9α - fluoro - 11β,17α,21-trihydroxy-1,4-pregnadiene - 3,20 - dione 21 - (4-methyl-1-piperazinyl) carbamate - d - bitartrate salt, or 11β,17α,21-trihydroxy-1,4 - pregnadiene - 3,20 - dione 21-(4-methyl-1-piperazinyl) carbamate-d-bitartrate salt.

EXAMPLE 7

*9α - Fluoro-16α-Methyl-11β,17α,21-Trihydroxy-1,4-Pregnadiene-3,20-Dione 21-(4-Methyl-1-Piperazinyl) Carbamate*

To a stirred solution of 3.05 g. of 9α-fluoro-16α-methyl-11β,17α,21 - trihydroxy-1,4-pregnadiene-3,20-dione 21-(4-methyl-1-piperazinyl) carbamate-d-bitartrate salt in 300 ml. of water is slowly added 4 ml. 2.5 N sodium hydroxide. The final pH of the mixture is about 11. The mixture is stirred for fifteen minutes and the white product is removed by suction filtration and washed with water. After drying at 50° C. under reduced pressure, there is obtained 9α-fluoro-16α-methyl-11β,17α,21-trihydroxy-1,4-pregnadiene-3,20-dione 21-(4-methyl-1-piperazinyl) carbamate.

In accordance with the foregoing procedure, but starting with

9α-fluoro-16α-methyl-17α,21 - dihydroxy-1,4-pregnadiene-3,11,20-trione 21-(4-methyl-1-piperazinyl) carbamate-d-bitartrate salt,
16α-methyl-17α,21-dihydroxy - 1,4 - pregnadiene-3,11,20-trione 21-(4-methyl-1-piperazinyl) carbamate-d-bitartrate salt,
16α-methyl-11β,17α,21 - trihydroxy-1,4-pregnadiene-3,20-dione 21-(4-methyl-1-piperazinyl) carbamate-d-bitartrate salt,
9α-fluoro-11β,17α,21-trihydroxy - 1,4 - pregnadiene-3,20-dione 21-(4-methyl-1-piperazinyl) carbamate-d-bitartrate salt, or
11β,17α,21 - trihydroxy-1,4-pregnadiene-3,20-dione 21-(4-methyl-1-piperazinyl) carbamate-d-bitartrate salt, there is obtained the corresponding 9α - fluoro-16α-methyl-17α,21-dihydroxy-1,4-pregnadiene-3,11,20-trione 21-(4-methyl-1-piperazinyl) carbamate,
16α-methyl-17α,21-dihydroxy-1,4-pregnadiene-3,11,20-trione 21-(4-methyl-1-piperazinyl) carbamate,
16α-methyl-11β,17α,21-trihydroxy-1,4-pregnadiene-3,20-dione 21-(4-methyl-1-piperazinyl) carbamate,
9α-fluoro-11β,17α,21-trihydroxy-1,4-pregnadiene-3,20-dione 21-(4-methyl-1-piperazinyl) carbamate, or
11β,17α,21-trihydroxy-1,4-pregnadiene-3,20-dione 21-(4-methyl-1-piperazinyl) carbamate.

*Example 8*

Fifty-eight mg. (1-millimole) of 9α-fluoro-16α-methyl-11β,17α,21 - trihydroxy-1,4-pregnadiene-3,20-dione 21-(4-methyl-1-piperazinyl) carbamate is dissolved in 5 ml. of dry ethanol. To this is added 1 ml. of absolute ethanol containing 10% anhydrous hydrogen chloride. This solution is then triturated with dry ethyl ether to induce precipitation of the hydrochloride salt of 9α-fluoro-16α-methyl - 11β,17α,21 - trihydroxy - 1,4 - pregnadiene-3,20-dione 21-(4-methyl-1-piperazinyl) carbamate. Ethyl acetate solutions (freshly prepared) of hydrogen chloride may be substituted for the alcoholic HCl.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group consisting of 21-(4-methyl-1-piperazinyl) carbamate of an 11-oxygenated-16-methyl-17α,21 - dihydroxy-3,20-diketo compound of the pregnane series and the d-bitartrate salts thereof.
2. 9α-fluoro - 16 - methyl-11β,17α,21-trihydroxy-1,4-pregnadiene-3,20-dione 21-(4-methyl-1-piperazinyl) carbamate-d-bitartrate salt.
3. 9α-fluoro-16-methyl-17α,21-dihydroxy - 1,4 - pregnadiene-3,11,20-trione 21-(4-methyl-1-piperazinyl) carbamate-d-bitartrate salt.
4. 16-methyl-17α,21-dihydroxy - 1,4 - pregnadiene-3,11, 20-trione 21-(4-methyl-1-piperazinyl) carbamate-d-bitartrate salt.
5. 16-methyl-11β,17α,21-trihydroxy - 1,4 - pregnadiene-3,20-dione 21-(4-methyl-1-piperazinyl) carbamate-d-bitartrate salt.
6. 9α-fluoro-11β,17α,21-trihydroxy - 1,4 - pregnadiene-3,20-dione 21-(4-methyl-1-piperazinyl) carbamate-d-bitartrate salt.
7. 11β,17α,21-trihydroxy - 1,4 - pregnadiene-3,20-dione 21-(4-methyl-1-piperazinyl) carbamate-d-bitartrate salt.
8. 9α-fluoro - 16 - methyl-11β,17α,21-trihydroxy-1,4-pregnadiene-3,20-dione 21-(4-methyl-1-piperazinyl) carbamate.
9. 9α-fluoro-16-methyl-17α,21-dihydroxy - 1,4 - pregnadiene-3,11,20-trione 21-(4-methyl-1-piperazinyl) carbamate.
10. 16 - methyl-17α,21-dihydroxy - 1,4 - pregnadiene-3,11,20-trione 21-(4-methyl-1-piperazinyl) carbamate.
11. 16-methyl-11β,17α,21 - trihydroxy-1,4-pregnadiene-3,20-dione 21-(4-methyl-1-piperazinyl) carbamate.
12. 9α-fluoro-11β,17α,21 - trihydroxy-1,4-pregnadiene-3,20-dione 21-(4-methyl-1-piperazinyl) carbamate.
13. 11β,17α,21 - trihydroxy-1,4-pregnadiene-3,20-dione 21-(4-methyl-1-piperazinyl) carbamate.
14. The process which comprises reacting an 11-oxygenated-17α,21-dihydroxy-3,20-diketo steroid compound of the pregnane series with a 4-methyl-1-piperazinyl salt, thereby forming the corresponding 21-(4-methyl-1-piperazinyl) carbamate, contacting said carbamate compound with d-tartaric acid to produce the corresponding 21-(4-methyl-1-piperazinyl) carbamate-d-bitartrate salt, and heating said salt with a strong base to yield the free steroid 21-(4-methyl-1-piperazinyl) carbamate compound.

15. The process according to claim 14 wherein the pregnane compound is 9α-fluoro-16α-methyl-11β,17α,-21-trihydroxy-1,4-pregnadiene-3,20-dione.

References Cited in the file of this patent

UNITED STATES PATENTS

| | | |
|---|---|---|
| 2,873,271 | Korman et al. | Feb. 10, 1959 |
| 2,873,285 | Korman et al. | Feb. 10, 1959 |
| 2,923,722 | Hogg | Feb. 2, 1960 |

OTHER REFERENCES

Royals: Advanced Organic Chemistry, page 609, Prentice-Hall, Inc., Englewood Cliffs, N.J., 1954 edition, second printing.